United States Patent [19]

Thomson et al.

[11] 4,380,199

[45] Apr. 19, 1983

[54] RAILROAD VEHICLE PEDESTAL WEAR LINER

[75] Inventors: George A. Thomson; Robert Haynes, both of Burlington, Canada

[73] Assignee: Thomson-Gordon Limited, Burlington, Canada

[21] Appl. No.: 235,833

[22] Filed: Feb. 19, 1981

[30] Foreign Application Priority Data

Sep. 18, 1980 [CA] Canada .................................. 360679

[51] Int. Cl.³ .......................... B61F 5/32; F16C 27/02; F16C 33/20
[52] U.S. Cl. .................................... 105/225; 105/207; 308/3 R
[58] Field of Search ............. 105/199 C, 199 CB, 222, 105/225, 207; 252/12, 12.4; 308/3 R

[56] References Cited

U.S. PATENT DOCUMENTS

| | | | |
|---|---|---|---|
| Re. 29,092 | 12/1976 | Schiefer et al. | 252/12.4 |
| 1,777,578 | 10/1930 | Roberts | 105/225 X |
| 3,554,618 | 1/1971 | Ditzler et al. | 308/31 R |
| 3,844,226 | 10/1974 | Brodeur et al. | 105/222 |
| 3,996,143 | 12/1976 | Orkin et al. | 252/12.4 |
| 4,001,124 | 1/1977 | Hussey | 252/12 |
| 4,094,253 | 6/1978 | Gage | 105/225 |
| 4,108,080 | 8/1978 | Garner et al. | 105/199 CB |
| 4,168,666 | 9/1979 | Gage | 105/225 |
| 4,170,180 | 10/1979 | Houston et al. | 105/225 |
| 4,188,888 | 2/1980 | Cooper et al. | 105/199 C |
| 4,237,793 | 12/1980 | Holden et al. | 105/225 |
| 4,313,384 | 2/1982 | Holden et al. | 105/225 |

FOREIGN PATENT DOCUMENTS 977326 11/1975 Canada .

Primary Examiner—Robert B. Reeves
Assistant Examiner—Howard Beltran

[57] ABSTRACT

A pedestal wear liner is described for attachment to a pedestal leg of a truck of a railroad vehicle having a journal box with a journal box wear plate facing the pedestal leg. The novel pedestal wear liner includes a unitary metallic support structure generally U-shaped in cross section with a central web portion and a pair of mounting legs for mounting the pedestal wear liners on a pedestal leg. The central web portion has a pair of flat portions adjacent the mounting legs and a central flat portion outwardly offset from the pair of flat portions. A hard elastomeric urethane polymer is bonded to the outer face of the metallic support structure, the elastomeric layer forming an outer flat wear surface across the entire central web of the metallic support and extending uninterrupted over at least part of the mounting legs.

3 Claims, 4 Drawing Figures

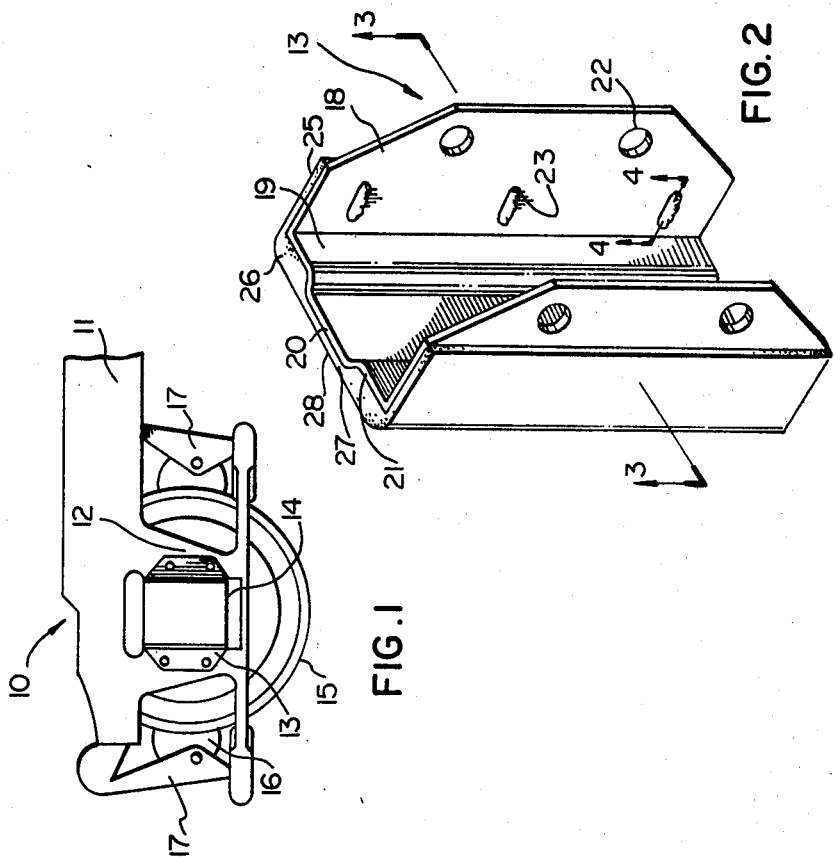

RAILROAD VEHICLE PEDESTAL WEAR LINER

BACKGROUND OF THE INVENTION

1. Field of the Invention

This invention relates to improvements in trucks for railroad vehicles, especially locomotives. More particularly, the invention relates to improved pedestal liners for those portions of the trucks which are slideably engaged to enable the wheels in the body of the locomotive to move relative to each other in a generally vertical direction.

2. Background of the Invention

The truck upon which a locomotive is supported comprises two side frames tied together by a transverse member known as a bolster. One type of truck commonly used for locomotives is referred to as a pedestal truck. The pedestals are part of the side frames and are formed in inverted U-shaped sections that horizontally position and hold a journal box to move essentially vertically in relationship to the truck. Two projections that comprise the U of the pedestal are called the pedestal legs and the space between them, the jaw. The jaw is closed at the bottom when the journal is inserted by means of a pedestal tie bar. In this manner, the journal box is held positioned in a vertical sliding relationship with the truck. As the locomotive body is supported by the bolster and side frames, vertical movement between the locomotive body and journal box, journal and wheels is permitted.

Considerably wear takes place at the interface between the pedestal and the journal box. Wear plates are attached to both the pedestal legs and journal boxes to reduce wear and protect the underlying parts. The wear plates attached to the pedestal legs are generally referred to as pedestal liners.

These pedestal liners have traditionally been made of a very hard low wear steel, such as manganese steel. The manganese steel is fitted to the guides with clearance, to allow the axle box to move up and down in response to the springing action provided in the suspension system. Frequently mating manganese steel plates are fixed to the axle box to reduce overall wear, but the problem with this system is, of course, that whenever steel runs against steel, wear takes place on both surfaces.

In more recent years, it has been found that much less wear occurs by using wear plates made from a tough plastic material, such as nylons, polyacetals, polyolefins, polycarbonates, polyethers, polyesters, polyurethanes, etc. as disclosed in U.S. Pat. No. 3,554,618. In particular, nylon pedestal liners have gained a degree of acceptance through the industry primarily because they outwear steel liners. The plastic liners also have the advantage of reducing the wear on mating metal surfaces such as pedestal legs and journal boxes.

While the plastic pedestal liners have in general proved to be considerably more satisfactory than the steel alloy liners, they do have disadvantages. For instance, they sometimes fail by cracking adjacent to those areas where they are bolted on to the pedestal. It is believed that under conditions of heavy use, the plastic liners may fracture due to the fatigue stress acting on liners to the point where they are secured to the pedestal leg. This stress cracking may become particularly pronounced under extreme cold winter conditions. To try to overcome this problem, U.S. Pat. No. 4,094,253 suggests that the pedestal liners not be secured to the pedestal legs but permitted to float. This has not been found to be altogether satisfactory and U.S. Pat. No. 4,170,180 suggests other possibilities for trying to fasten a cast nylon pedestal liner while avoiding the fastening problems discussed above.

U.S. Pat. No. 3,554,618 discloses a two piece pedestal liner assembly using a metal support with a plastic wear surface area. The face of the backing plate contains a large hole within which is placed the nylon wear plate, but in this arrangement the nylon is ineffective in carrying or distributing the applied load. Consequently, the area of nylon left incapable of carrying the load is pressurized more highly than it ought to be. Thus, it will be seen that all of the designs either using steel pedestal liners, cast plastic pedestal liners or combined steel and plastic pedestal liners available to date have serious disadvantages.

It is the object of the present invention to produce a pedestal liner in which a polymeric wear resistance layer is cast and polymerized directly on a steel backing plate such that the polymer is firmly bonded to the backing plate.

SUMMARY OF THE INVENTION

The present invention relates to a railroad vehicle pedestal wear liner for attachment to the pedestal leg of a truck of a railroad vehicle which includes a journal box having a journal box wear plate facing a pedestal leg. The pedestal wear liner comprises a unitary metallic support structure generally U-shaped in cross section with a central web portion and a pair of mounting legs for mounting the pedestal wear liner on a pedestal leg. The central web portion has a pair of flat portions adjacent the mounting legs and a central flat portion outwardly offset from the pair of flat portions. Means are provided in each of the mounting legs for receiving fastening elements for securing the legs to the sides of a pedestal leg. A hard synthetic elastomer layer is bonded to the outer face of the metallic support structure and this polymeric layer forms an outer flat wear surface across the entire central web of the metallic support and extends uninterrupted over at least part of the mounting legs. The elastomer is a solid, hard, elastomeric urethane polymer having a shore D hardness of at least 60, a compressive modulus of elasticity at a 4% compressive strain of at least 50,000 psi and a dry dynamic coefficient of friction against steel of no more than 0.20.

The polymer is cast and polymerized directly to the steel backing plate and is directly bonded to the plate by way of a rubber-to-metal adhesive. A further mechanical locking may be used by providing slots in the mounting legs and allowing the elastomer to flow into and fill the slots, thereby providing a mechanical interlock.

The particular combination of steel backing plate and solid, hard, elastomeric urethane polymer of this invention provides unique advantages over the two piece pedestal liner assembly described in U.S. Pat. No. 3,554,618 as well as the cast pedestal liners made entirely of nylon materials, such as that described in U.S. Pat. No. 4,168,666.

Thus, with the pedestal wear liner of the present invention, the central web portion of the steel backing plate has sufficient strength and rigidity to uniformly support the plastic liner across the full face area. The steel backing plate also provides adequate strength to permit conventional bolting means of securing the liner.

The particular polymer used for the wear resistant coating is also unique in this invention in its ability to be firmly bonded to the backing plate as well as in its excellent wear resistant characteristics.

The preferred polymer is a product sold by Thomson-Gordon Ltd., Burlington, Ontario, Canada under the trademark THORDON XL. The THORDON products are polyurethane elastomers typically having a polyolefin wax distributed therethrough and preferably having a Shore hardness of from 650 to 800, with a polymer which is the reaction product of a polyether or a polyester with a polyisocyanate being particularly preferred. Further details of these polymers are given in Canadian Pat. No. 997,326, issued Sept. 21, 1976, the contents of which are incorporated herein by reference.

The invention may more readily be understood in accordance with the accompanying drawings in which:

FIG. 1 is a side view, partially broken away, of the side frame of a pedestal truck, illustrating the pedestal liner assembly according to the present invention;

FIG. 2 is an enlarged perspective view illustrating a pedestal liner according to the present invention;

FIG. 3 is an enlarged view illustrating a cross section of the pedestal liner taken along line 3—3 of FIG. 2; and FIG. 4 is an enlarged sectional view of a portion of a pedestal wear line mounting leg.

Referring to FIG. 1, there is illustrated a railroad truck 10 of the pedestal type having a side frame 11 and pedestal legs 12. Attached to these pedestal legs 12 are the pedestal wear liners 13 of the present invention. These pedestal liners 13 define the inner surface of the pedestal legs of the side frame 11. The pedestal legs 12 are designed to receive the journal box 14 which has a vertical sliding relationship with the pedestal legs. Also shown are a wheel 15, a pair of brake shoes 16 and a brake linkage 17.

As can best be seen from FIGS. 2, 3 and 4, the pedestal wear liner 13 includes a steel backing plate of generally U-shape in cross section with side mounting legs 18 and a central web portion joining the legs 18. This central web portion includes a pair of flat portions 19 adjacent the mounting legs 18 and a central flat portion 20 outwardly offset from the flat portions 19 by curved portions 21.

Holes 22 are provided in the mounting legs for inserting bolts to mount the liners.

On the outer face of the backing plate is adhesively bonded a THORDON XL layer 24 and this includes side portions 25 extending part way up the mounting legs 18 and a central flat outer face 28. Because of the outwardly offset back plate portion 20, the portion of the elastomer adjacent the central web of the back plate has thick portions 26 adjacent the corners and a central thin portion 27.

In order to further mechanically join the elastomer layer 24 to the back plate, a series of slots 33 are provided in the mounting legs 18 and when the elastomer is cast directly to the backing plate it fills the slots as shown in FIG. 4 providing a very strong mechanical interlock. Thus there is not only surface to surface bonding between the elastomer and the steel backing plate but also this mechanical interlock. In order to provide an even more positive locking, the slots may be formed by cutting on three sides and punching a tab outwardly. This outwardly bent tab is then embedded in the elastomer.

The offset portion 20 of the central web of the backing plate serves a dual function. It firstly provides greater strength and stiffness to the backing plate in the region where the greatest loads are applied and also, because of the particular design of the offset portion, it provides a channel through which water will drain, thereby preventing any formation of ice between the pedestal wear liner and the pedestal casting face.

EXAMPLE

A pedestal wear liner was produced commencing with a steel channel member of the configuration shown in FIGS. 2 and 3. The channel had a length of about 15 inches, a width of about 7 inches and a steel thickness of about ⅛ inch. The offset portion in the central web extended outwardly a distance of about ⅜ inch from the main portion of the web.

A metal mold was also prepared having a molding face corresponding to the outer face of the Thordon coating as shown in FIGS. 2 and 3.

The outer surface of the steel channel to which the coating was to be applied was roughened by sand blast and these sand blasted areas were then washed with a highly volatile solvent and allowed to dry. A thin even coating of Chemlock 218 adhesive was applied to the roughened portions of the surface of the channel. The channel with adhesive applied was then heated in an oven at 212° F. for about 30 minutes to permit solvents in the adhesive to evaporate.

The channel and mold were thereafter both heated in assembled position and the cavity between the mold and channel were filled with a Thordon XL casting composition and allowed to set for 30 minutes within the oven at 212° F., after which the mold was removed and the pedestal liner with the Thordon coating was heated for a further 4 to 8 hours in a 212° F. oven. After aging at room temperature for about 7 days, the pedestal liner was ready for use.

We claim:

1. A railroad vehicle pedestal wear liner for attachment to the pedestal leg of a truck of a railroad vehicle which includes a journal box having a journal box wear plate facing said pedestal leg, said pedestal wear liner comprising a unitary metallic support structure generally U-shaped in cross section with a central web portion and a pair of mounting legs for mounting the pedestal wear liner on a pedestal leg; said central web portion having a pair of flat portions adjacent said mounting legs and a central flat portion outwardly offset from said pair of flat portions, means in each of said mounting legs for receiving fastening elements for securing said legs to the sides of a pedestal leg and a solid, hard, elastomeric urethane polomer forming a synthetic elastomer layer bonded to the outer face of said metallic support structure, said elastomer layer forming an outer flat wear surface across the entire central web of the metallic support and extending continuously over at least part of said mounting legs and filling openings in said legs to provide a mechanical interlock between the elastomer and the metallic support.

2. A pedestal wear liner according to claim 1 wherein the elastomer is THORDON XL.

3. A pedestal wear liner according to claim 1 wherein a rubber-to-metal adhesive is applied between the elastomer and the metallic support.

* * * * *